United States Patent [19]
Hara et al.

[11] 4,370,668
[45] Jan. 25, 1983

[54] LIQUID EJECTING RECORDING PROCESS

[75] Inventors: Toshitami Hara, Tokyo; Shigeyuki Matsumoto, Kawasaki, both of Japan

[73] Assignee: Canon Kabushiki Kaisha, Tokyo, Japan

[21] Appl. No.: 208,040

[22] Filed: Nov. 18, 1980

[30] Foreign Application Priority Data

Dec. 28, 1979 [JP] Japan ........................ 54-171336

[51] Int. Cl.[3] ........................ G01D 15/18
[52] U.S. Cl. ........................ 346/140 R
[58] Field of Search ........................ 346/140 PD

[56] References Cited

U.S. PATENT DOCUMENTS 4,251,824 2/1981 Hara et al. .................. 346/140 PD

*Primary Examiner*—George H. Miller, Jr.
*Attorney, Agent, or Firm*—Fitzpatrick, Cella, Harper & Scinto

[57] ABSTRACT

A liquid ejecting recording process using a liquid ejecting recording head comprises a liquid discharging portion including an orifice for ejecting liquid droplets and a heat acting portion communicated with said orifice, said heat acting portion being a portion where heat energy for discharging liquid droplets acts to a liquid, and an electrothermal transducer having a structure laminated on a substrate with the layers mentioned below in the following order a lower layer, a resistive heater layer, and an upper layer from the substrate to the heat acting portion on the position of the heat acting portion, characterized in that when a signal voltage is applied to said resistive heater layer and potentials generating at two electrodes A and B connected with said resistive heater layer are represented by $V_A$ and $V_B$, respectively, potential V applied to at least the surface portion of said upper layer is kept intermediate between $V_A$ and $V_B$ at least while said signal voltage is applied to said resistive heater layer.

5 Claims, 3 Drawing Figures

LIQUID EJECTING RECORDING PROCESS

BACKGROUND OF THE INVENTION

1. Field of the Invention

The present invention relates to a liquid ejecting recording process, and more particularly, to a liquid ejecting recording process which comprises ejecting liquid, projecting a liquid droplet, and recording.

2. Description of the Prior Art

The non-impact recording system has become of interest in recent years since the system is substantially free from noise during recording. Among the non-impact recording system, the so-called ink jet recording process (the liquid ejecting recording process) is recognized as a very useful recording system, since the recording can be carried out at high speed and made on plain paper without any particular fixing treatment. Heretofore, various ink jet recording methods have been proposed. Some are practicably used and some are still under development.

Among ink jet recording methods, the method disclosed in Deutsche Offenlengungsschrift (DOLS) Nr. 2843064 has a feature that heat energy is applied to a liquid to eject liquid droplets, that is, heat energy is utilized as an energy for forming liquid droplets. This feature is quite different from features of conventional ink jet recording methods.

According to the method as disclosed in the above-mentioned patent applications, when a liquid is actuated by heat energy, the liquid is subjected to a state change including a rapid increase in volume and the resulting actuating force serves to eject liquid droplets from an orifice at the tip of the recording and the ejected droplets are deposited onto a record receiving member.

The liquid ejecting recording process disclosed in DOLS Nr. 2843064 has such advantages that it is not only very effectively applicable to the so-called "drop-on-demand recording system", but it may have the recording head portion arranged in the form of high density multi-orifice in full breadth of the recording pages. Therefore, it is a feature of the present process that images which are excellent in resolution and of high quality are obtained.

As mentioned above, said liquid ejecting recording process has excellent advantages. However, it is necessary that the life (durability) on repeated use of the recording head is enhanced in order to record images of excellent resolution and high quality at a higher speed for a long time, or to increase greatly the life of the apparatus.

The life of the recording head employed in the foregoing recording process is mainly determined by the life of an electrothermal transducer. For example, the recording head employed in the foregoing recording process has such a structure as shown in FIGS. 1A and 1B. In general, an electrothermal transducer 102 contacts a liquid introduced in the direction of arrow A at a heating surface 109 (an energy applying surface) in a heat acting portion 107 (a liquid droplet forming energy actuating portion), and the generated heat energy (a liquid droplet forming energy) is effectively and efficiently applied to the liquid present in heat acting portion 107.

When water is used as a liquid medium for the recording liquid, an upper layer 112 is disposed at least on a resistive heater layer 111 at a heat generating portion 108 so as to prevent shortcircuiting through the recording liquid between electrodes 113 and 114 and protect a resistive heater layer 111 from attack by the recording liquid or thermal oxidation. When the liquid medium is not water, the above situation may be changed.

In the process using such recording head, the principle forming a liquid droplet of the recording liquid is as follows: when electric current is conducted to said electrothermal transducer, the resulting heat energy (a liquid droplet forming energy) is applied to a recording liquid in heat acting portion 107 and thereby a state change of the recording liquid accompanied by a rapid increase in volume (i.e. a change that the recording liquid in heat acting portion 107 is converted to a gaseous state in a very short time such as less than microsecond) is caused, and a bubble is generated and grown in a moment in the heat acting portion 107. Then, when said electric current is off, the bubble is rapidly shrunk and disappears in a moment. This shrinking and disappearing speed is almost the same as or a little slower than the speed of bubble generation and growing, and anyhow it is very fast.

The present inventors have found that in this repeating of generation, growing, shrinking and disappearing, particularly, the latter part, i.e. the shrinking and disappearing of bubble, is an important factor determining the life of the electrothermal transducer.

The process of shrinking and disappearing of a bubble proceeds at a remarkable high speed so that the resulting shock wave directly attacks the heating surface 109, and therefore, upon each liquid droplet ejection the heating surface 109 is attacked by the shock wave resulting in corrosion or destruction of the heating surface due to the shock wave. In particular, the higher the application frequency (driving frequency) of the input pulse signal to drive electrothermal transducer 102, that is, the higher the frequency of liquid droplet formation for high speed recording and the higher the level of the input pulse signal, the larger the attack of the shock wave to the heating surface 109, and this is a fundamental cause of shortening the life of electrothermal transducer 102.

SUMMARY OF THE INVENTION

An object of the present invention is to provide a liquid droplet ejecting recording head free from the above mentioned disadvantages.

Another object of the present invention is to provide a liquid ejecting recording process in which life of a recording head is very long and reliability of stable ejection of liquid droplet is very high.

According to the present invention, there is provided a liquid ejecting recording process using a liquid ejecting recording head comprising a liquid discharging portion including an orifice for ejecting liquid droplets and a heat acting portion communicated with said orifice, said heat acting portion being a portion where heat energy for discharging liquid droplets acts to a liquid, and an electrothermal transducer having a structure laminated on a substrate. The structure includes a lower layer 110 located on the substrate, a resistive heater layer 111, and an upper layer 112 positioned uppermost from the substrate and having heat surface 109 a portion on which is positioned in the heat acting portion. This process is characterized in that when a signal voltage is applied to said resistive heater layer and potentials are generated at two electrodes A and B connected with said resistive heater layer with the potentials represented by $V_A$ and $V_B$, respectively, potential V applied to the surface portion of said upper layer is kept intermediate between $V_A$ and $V_B$ at least while said signal voltage is applied to said resistive heater layer.

DESCRIPTION OF THE PREFERRED EMBODIMENTS

Figure 1A:
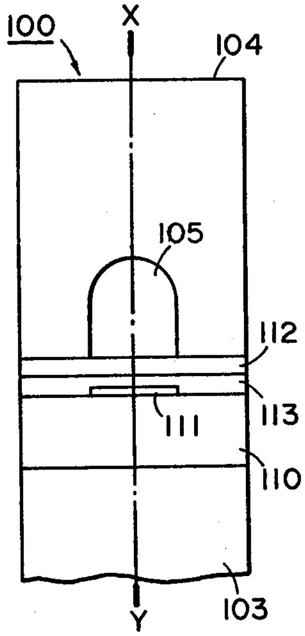
FIG. 1A is a schematic partial front view from the orifice side of a liquid ejecting recording head according to the present invention.
Figure 1B:
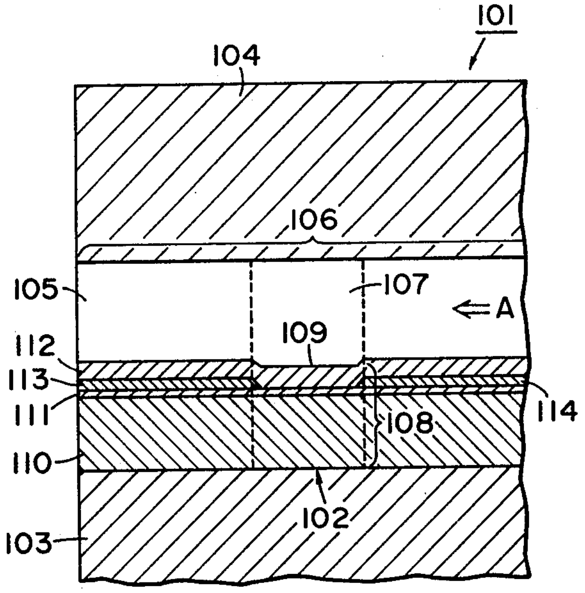
FIG. 1B is a schematic partial cross sectional view taken along the dot and dash line X-Y of FIG. 1A.
Figure 2:
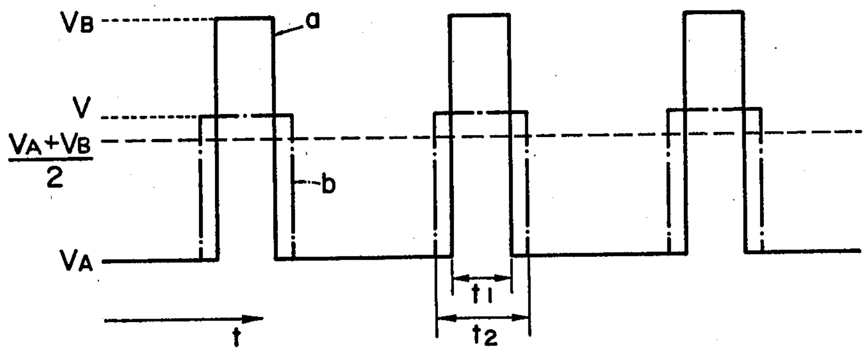
FIG. 2 is a timing chart for explaining the present invention.

Referring to FIGS. 1A, 1B and 2, the liquid ejecting recording process according to the present invention will be described more in detail.

In FIGS. 1A and 1B, if it is assumed that a potential V is applied to a heating surface 109 which constitutes a part of the wall in a heat acting portion 107 of an upper layer 112, V is kept in such a relationship as $V=V_A(1-x)+V_Bx$ (where $0<x<1$) during liquid droplets discharge. In this case, it is desirable that liquid droplets are ejected under the condition wherein the value of V is so set that x is preferably in a range of from 0.2 to 0.8, or more preferably from 0.4 to 0.6.

In the above-mentioned case, $V_A$ and $V_B$ represent potentials at electrodes 113 and 114, respectively. The potential difference $|V_A-V_B|$ is generated at a portion of a resistive heater layer 111 (the portion of the resistive heater layer having the width shown by two dotted lines in FIG. 1-B) which is positioned under heat acting portion 107.

According to the present invention, the surface portion (surface layer) of the upper layer 112 is electrically conductive so that the potential V may be applied to upper layer 112 in the foregoing manner. In other words, the upper layer is designed and produced in the following manner. The inner part (inner layer) of the upper layer 112, that is, the portion where it contacts electrodes, 113 and 114, and resistive heater layer 111 is electrically insulative so that almost all electric current may not flow through a route other than that of electrode 113-resistive heater layer 111-electrode 114. And a conductive surface layer is provided on the electrically insulating inner layer by use of metals and the like.

FIG. 2 shows an example of a pulse potential signal applied to electrothermal transducer 102 for discharging liquid droplets according to the present recording process. $V_A$ represents a potential at electrode 113, $V_B$ a potential at electrode 114, and V a potential at heating surface 109, representively. The life of the recording head can be made longer in such a manner that a width $t_1$ of a voltage a applied to between electrodes 113 and 114 is the same as or shorter than the width $t_2$ of a voltage b applied to heating surface 109. Further, V is not only applied in pulse manner as shown in FIG. 2, but V may be continuously applied. The effect of the present invention can be maximized by such a way that V is kept at $(V_B+V_A)/2$ or a voltage near the value. For example, the life of the recording head can be extended to at least two times that in the conventional process.

According to the present invention, potential V is intermediate between $V_A$ and $V_B$, and applied to heating surface 109 synchronously with a signal applied to the electrothermal transducer or continuously while the electrothermal transducer is driven, in the foregoing way.

According to the present liquid ejecting recording process, a potential at the surface portion of the upper layer of the electrothermal transducer is kept intermediate between potentials, $V_A$ and $V_B$, at both terminals of the resistive heater layer which is present between the two electrodes which are electrically connected to the resistive heater layer upon discharging liquid droplets, therefore it is possible that a stable liquid droplet ejection is continuously carried out for a long time and the life of the recording head is extended to a great extent even when the frequency of forming liquid droplets is increased to a great extent for a high speed recording and the level of pulse signals applied to the electrothermal transducer is elevated.

The present invention will be further described by the following example.

Example

On a silicon substrate was formed an $SiO_2$ layer in the thickness of 4 microns by sputtering and then a resistive heater, $HfB_2$, was formed in the thickness of 1500 Å by sputtering (formation of resistive heater layer 111). Then an aluminum layer was deposited as electrodes in the thickness of 5000 Å by means of an electron beam vapor deposition and then a pattern as shown in FIG. 1B was formed by selective etching. The resistive heater is 50 microns wide and 200 microns long and of 80 ohm. Then, $SiO_2$ film was formed as a lower layer in the thickness of 1.2 microns, thereafter Ta layer is laminated in the thickness of 2.0 microns by sputtering to form an upper protective film (surface layer 112).

To the above mentioned substrate was bonded to a glass plate having grooves to produce a recording head as illustrated in FIG. 1A. While introducing an ink mainly composed of water into the recording head, a voltage of 28 V having a pulse width of 10 micron sec. was applied to the head by the cycle of 200 micron sec. to eject liquid droplets corresponding to input signals. When the voltage applied to the recording head was allowed to rise, the head was dielectrically broken down at 35 V to become unusable.

When one half voltage of a voltage applied to the resistive heater layer was continuously applied to the Ta protective film of the recording head produced in the same manner as described above, dielectric breakdown voltage was elevated up to 50 V despite an initial ejection voltage of 28 V which is the same as mentioned above. When one half voltage of the voltage applied to the resistive heater layer was applied to the Ta protective film by a pulse width of 15 micron sec. only on application of voltage to the resistive heater layer in the manner shown in FIG. 2, a good result was similarly obtained.

What we claim is:

1. A liquid ejecting recording process using a liquid ejecting recording head comprising: a liquid discharging portion including an orifice for ejecting liquid droplets, a heat acting portion in communication with the orifice, said heat acting portion being a portion where heat energy for discharging liquid droplets acts on a liquid, and an electrothermal transducer having a laminated structure provided on a substrate, with the structure comprising a lower layer positioned on the substrate, a resistive heater layer having electrodes A and B electrically connected thereto, and an upper layer positioned uppermost from the substrate and having a heating surface a portion of which is positioned in the heat acting portion, so that when a potential V is applied to the heating surface and potentials $V_A$ and $V_B$ are generated at the electrodes A and B, respectively, of said resistive heater layer, the potential V applied to the heating surface is kept at a potential intermediate the potentials $V_A$ and $V_B$.

2. A liquid ejecting recording process according to claim 1 in which potential V satisfies the following equation $$V=V_A(1-x)+V_Bx(0.2\leqq x\leqq 0.8).$$

3. A liquid ejecting recording process according to claim 1 in which potential V satisfies the following equation $$V=V_A(1-x)+V_Bx(0.4\leqq x\leqq 0.6).$$

4. A liquid ejecting recording process according to claim 1 in which potential V satisfies the following equation $$V\simeq V_A+V_B/2.$$

5. A liquid ejecting recording process according to claim 1 in which time period $t_1$ for single application of a signal voltage is the same as or shorter than time period $t_2$ for single application of a voltage V applied to a surface portion.

* * * * *